E., A. & C. Kilburn,
Bending Wood,
Nº 15,851. Patented Oct. 7, 1856.

UNITED STATES PATENT OFFICE.

EDWIN KILBURN, ARTEMUS KILBURN, AND CHENEY KILBURN, OF BURLINGTON, VERMONT.

METHOD OF BENDING WOOD.

Specification of Letters Patent No. 15,851, dated October 7, 1856.

*To all whom it may concern:*

Be it known that we, EDWIN KILBURN, ARTEMUS KILBURN, and CHENEY KILBURN, of Burlington, in the county of Chittenden and State of Vermont, have invented a new and useful Improvement in Bending Wood; and we do hereby declare that the following is a full, clear, and exact description of the same, reference being had to the accompanying drawings, forming part of this specification, in which—

Figure 1:
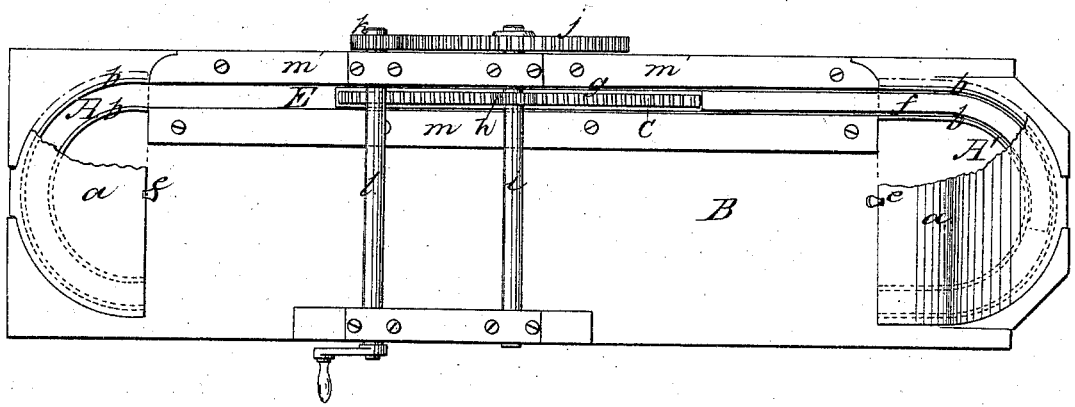
Figure 2:
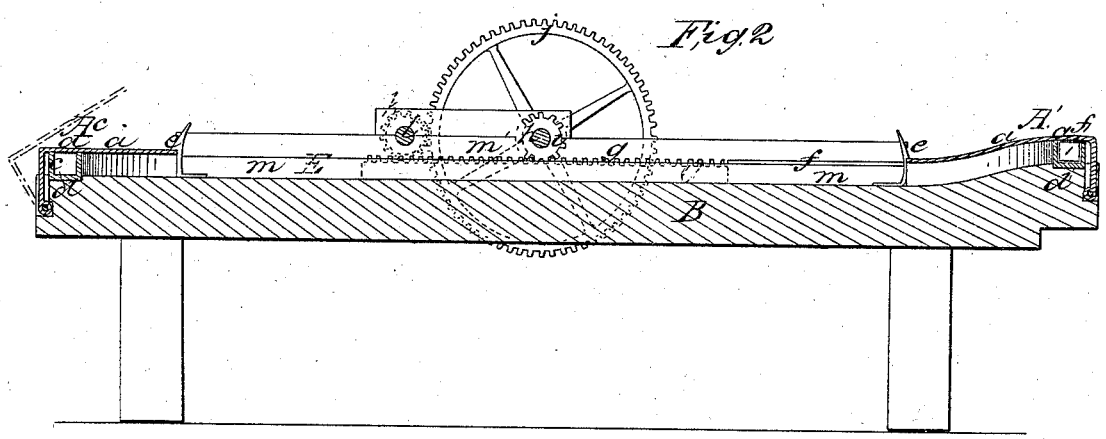

Figure 1 is a plan of a machine for performing our invention. Fig. 2, is a central longitudinal vertical section of the same. Similar letters of reference indicate corresponding parts in both figures.

This invention consists in bending wood by forcing it endwise of the fibers into a close sided mold having the desired curved form longitudinally and having its internal transverse section only just of the dimensions of the transverse section of the piece of wood, thus causing it to be confined laterally in all directions during the bending process and thereby preventing it breaking, splitting or splintering.

The machine represented in the accompanying drawing contains two molds A, and $A^1$, the former of which gives the wood a bend in one direction only and the latter in two directions. These molds are made of cast iron or other metal and are placed at opposite ends of a bench or bed B. They are made in the form of boxes with hinged lids $a$, $a$. Their longitudinal form is made exactly of the desired curve of the wood, and their transverse form of the transverse form of the stick, and of uniform area from end to end, or, in other words, with parallel sides $b$, $b$, and a parallel top and bottom, $a$, $d$. The lids $a$, $a$, have suitable fastenings at $e$, $e$, to keep them closed. They are shown partly broken away in Fig. 1, to expose the sides and interior of the molds and also to show a stick of wood $f$, which is supposed to be undergoing the bending process in $A^1$.

Opposite to one end of each mold there is a straight and parallel groove or channel E, which is of a suitable width to receive within it the stick of timber to be bent, and therefore of the same width as the interior of the mold, and this groove or channel contains a straight sliding driver C, consisting of a strong bar of wood or metal which may be operated by a toothed rack and pinion, a screw, or any suitable mechanical power for the purpose of forcing the stick of wood endwise from the groove or channel into the mold.

The mechanism represented for operating the driver consists of a toothed rack $g$, on its upper side, gearing with a pinion $h$, on a transverse shaft $i$, which carries a larger gear $j$, receiving motion from a pinion $k$, on a driving shaft $l$, which receives rotary motion through any suitable means.

The stick or piece of wood to be bent is planed or otherwise wrought to make it of uniform thickness to slide easily in the channel E, and mold A, or $A^1$, and previous to bending is steamed in the usual or any suitable manner. The mold has its lid $a$, closed during the bending operation. The steamed stick is put into the channel E, and the driver C, being set in motion toward the mold, forces it endwise into and along the mold, causing it to assume the form thereof without injury in any part, injury being rendered impossible by the part undergoing the bending process being confined on all sides within the mold. When the stick is bent as far along it as desirable, the driver is stopped and the lid $a$ opened, and it is taken from the mold. The bent stick may subsequently have its transverse section worked up to any desired form.

One bench B, may be furnished with a number of molds of different forms and sizes, one of which may be substituted for another at pleasure, said molds being fitted and bolted to the bench in any suitable manner.

The size of the channel E, may be varied to suit different molds by making the sides $m$, $m^1$, adjustable.

What we claim as our invention, and desire to secure by Letters Patent is,

The bending of wood by forcing it endwise of its fibers into a mold which is closed on all its sides, but has an open end, is curved longitudinally in the required form, and has the dimensions of its internal transverse section of the piece of wood, thus causing the wood to be confined in a lateral direction during the bending process for the purpose of preventing the separation of the fibers, as herein described.

EDWIN KILBURN.
ARTEMUS KILBURN.
CHENEY KILBURN.

Witnesses:
T. E. WALES,
SAM HUNTINGTON.